United States Patent [19]
Strassburg

[11] 3,753,374
[45] Aug. 21, 1973

[54] MEASURING INSTRUMENT WITH GYRO

[76] Inventor: Lothar Strassburg, Humboldstrasse 27, 464 Wattenscheid-Eppendorf, Germany

[22] Filed: June 21, 1972

[21] Appl. No.: 264,795

Related U.S. Application Data

[63] Continuation-in-part of Ser. No. 1,193, Jan. 7, 1970, abandoned.

[52] U.S. Cl. .................................. 74/5.7, 33/72 G
[51] Int. Cl. ............................................ G01c 19/10
[58] Field of Search .................. 33/72 G; 318/138; 320/2; 74/5, 5.7

[56] References Cited
UNITED STATES PATENTS

| | | |
|---|---|---|
| 3,419,967 | 1/1969 | Rocks et al. ........................ 33/72 G |
| 3,096,467 | 7/1963 | Angus et al. ........................ 318/138 |
| 3,539,898 | 11/1970 | Tolmie ................................ 320/2 X |
| 3,162,951 | 12/1964 | Hintze et al. ....................... 33/72 G |
| 2,930,240 | 3/1960 | Rellensmann et al. ............. 74/5.7 X |
| 2,163,523 | 6/1939 | Lauck ................................. 74/5.7 X |
| 1,876,548 | 9/1932 | Atherton ............................. 310/138 |

Primary Examiner—Manuel A. Antonakas
Attorney—Malcolm W. Fraser

[57] ABSTRACT

A measuring instrument incorporating a gyro, in particular a gyro-compass, in which a gyro forms the measuring device proper and in which the current source for the gyro is built into the north-seeking system. The gyro consists of an electronically controlled brushless d.c. motor, adjusted as regards its rate of rotation, and having a permanent magnet rotor.

2 Claims, 5 Drawing Figures

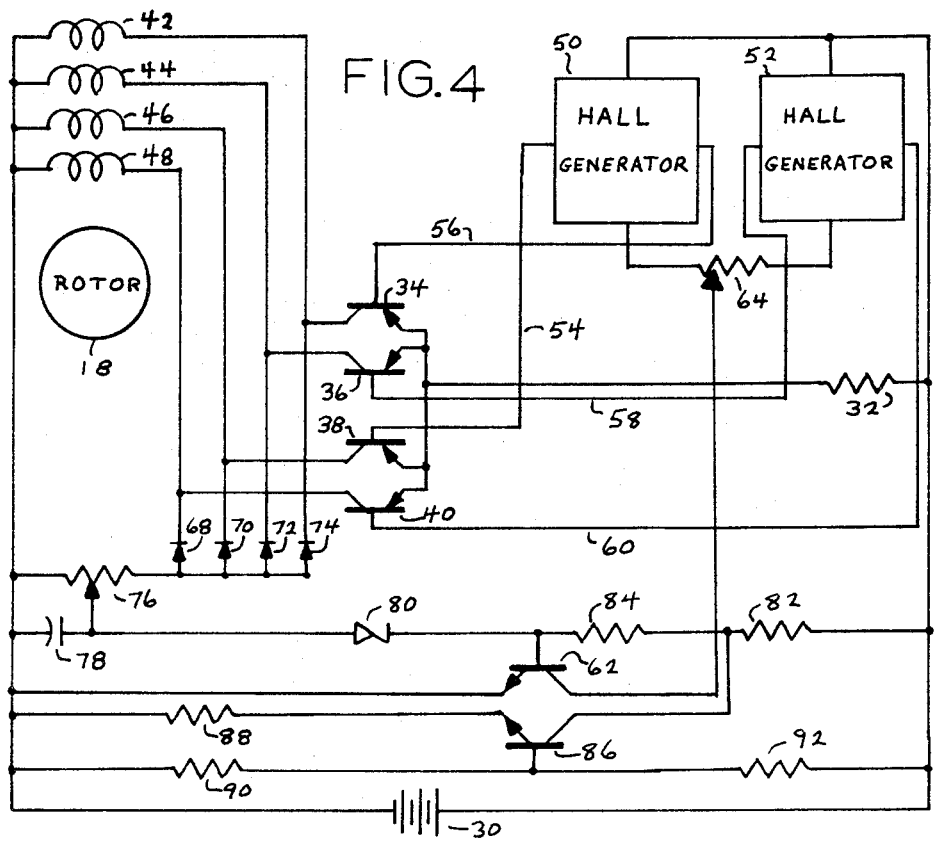
FIG.4
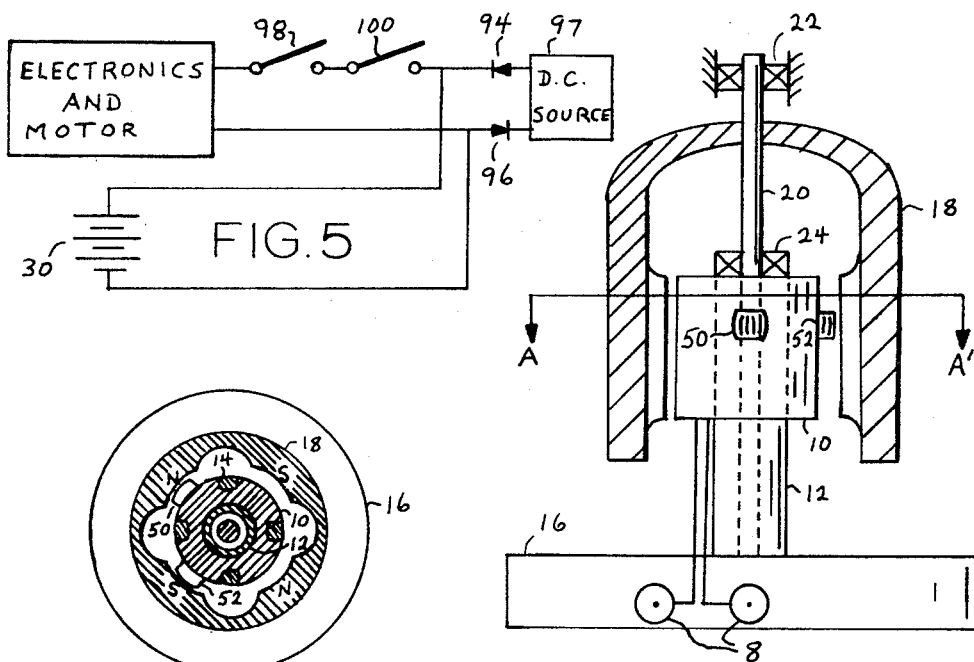
FIG.5
FIG.2
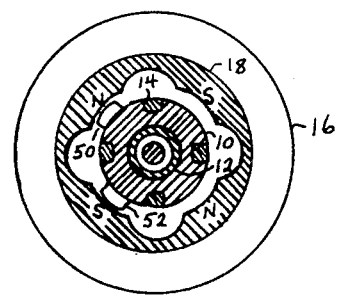
FIG.3

MEASURING INSTRUMENT WITH GYRO

CROSS-REFERENCE TO RELATED APPLICATION

This application is a continuation-in-part of my copending U. S. Pat. application No. 1,193, filed Jan. 7, 1970 now abandoned.

BACKGROUND OF THE INVENTION

The invention relates, as indicated, to a measuring instrument incorporating a gyro, more particularly a gyro-compass, wherein the gyro forms the actual measuring device and the current-source for the gyro is built into a directionally stable subsystem, typically the north-seeking system of the instrument.

Such measuring instruments are employed especially as gyro-compasses, more particularly in performing tasks connected with surveying. The use of such instruments generally necessitates a very simple electrical construction for the compass and, when employed for measurements associated with mine-surveying, in addition an embodiment of the said construction which is explosion-proof and safe in the presence of fire-damp.

It is already known to supply the gyro-compass with the current needed for driving an electric motor which constitutes the gyro through strips or mercury contacts, or electrolytically by pairs of electrodes. This technique has the drawback that a system has to be provided for supplying power from the fixed part of the measuring instrument to the north-seeking system. The means required for this, however, exert on the measuring system more or less large stresses which have a disturbing effect on the measurements, and are liable to falsify the result of measurement.

Means of this type can be dispensed with if the measuring instrument is constucted according to the opening passage above, because in these measuring instruments the electrical means are built constructionally into the measuring system. Measuring instruments constructed according to this principle have two substantial drawbacks — first, that the static masses of the north-seeking system are relatively large, for which reason thick suspension strips and/or voluminous floating bodies are required and, second, that the efficiency of the gyro drive is relatively low, so that, with the north-seeking system possessing a small mass, the period of usefulness in operation is too brief.

The invention provides a measuring instrument, preferably for use in mining, which makes unnecessary means for the conducting of current between the static and the north-seeking system of the instrument, which has an adequate period of usefulness in operation, and which can be practised with a relatively light-weight north-seeking system.

In accordance with the invention, the gyro consists of an electronically controlled brushless d.c. motor adjusted as regards its rate of rotation and having a permanent magnet rotor.

In comparison with the drives previously employed in the measuring instruments mentioned initially, such a motor requires only little electric power. Its efficiency is very great compared with traditional motors.

By these means, only a very small battery is required for an adequate period of useful operation with the consequence that, in spite of the period of useful operation being adequate, a small mass for the north-seeking system is rendered possible. This has the advantage that thin suspension strips and/or small floating bodies are adequate for current supply, the accuracy of the instrument in measurement thus being substantially improved. This is in addition to the circumstance that the control electronics required for electronically controlled brushless d.c. motors with permanent-magnet rotors are far less bulky than the electronics required to control traditional gyro motors.

The gyro is preferably formed as an external rotor. It may usefully be housed with the source of current and with a battery-charging device in a single housing for the measuring device.

The initially detailed results of the invention render it possible to form the measuring instrument as an explosion-proof instrument, i.e., an instrument which is safe in the presence of fire-damp. It is useful to practice the invention in such a way that the housing for the measuring system is formed to be explosion-proof and, in particular, safe as regards fire-damp. A low-voltage transformer is preferably used in front of the battery-charging device, and is accommodated in the housing and with connection sockets attached externally on the housing. The charging transformer allows physical separation of the circuit inside the enclosed housing from the two connection sockets. Therefore the measuring system can be plugged in, while in the locked position, to an a.c. source, so that the battery may be charged. The a.c. source can be used in an environment in which protection against explosion is not required, for instance, above ground. On the other hand, it is not possible to tap electric power for the measuring system in an environment liable to the risk of explosion, for example, underground.

BRIEF DESCRIPTION OF THE DRAWINGS

FIGS. 2 and 3 are views of a gyro motor adaptable for use in the system of the invention.

FIG. 4 is a schematic block diagram of a current control circuit for use in the invention.

FIG. 5 is a schematic block diagram of an alternative battery charging system for use from a d.c source.

DESCRIPTION OF THE PREFERRED EMBODIMENTS

Figure 1:
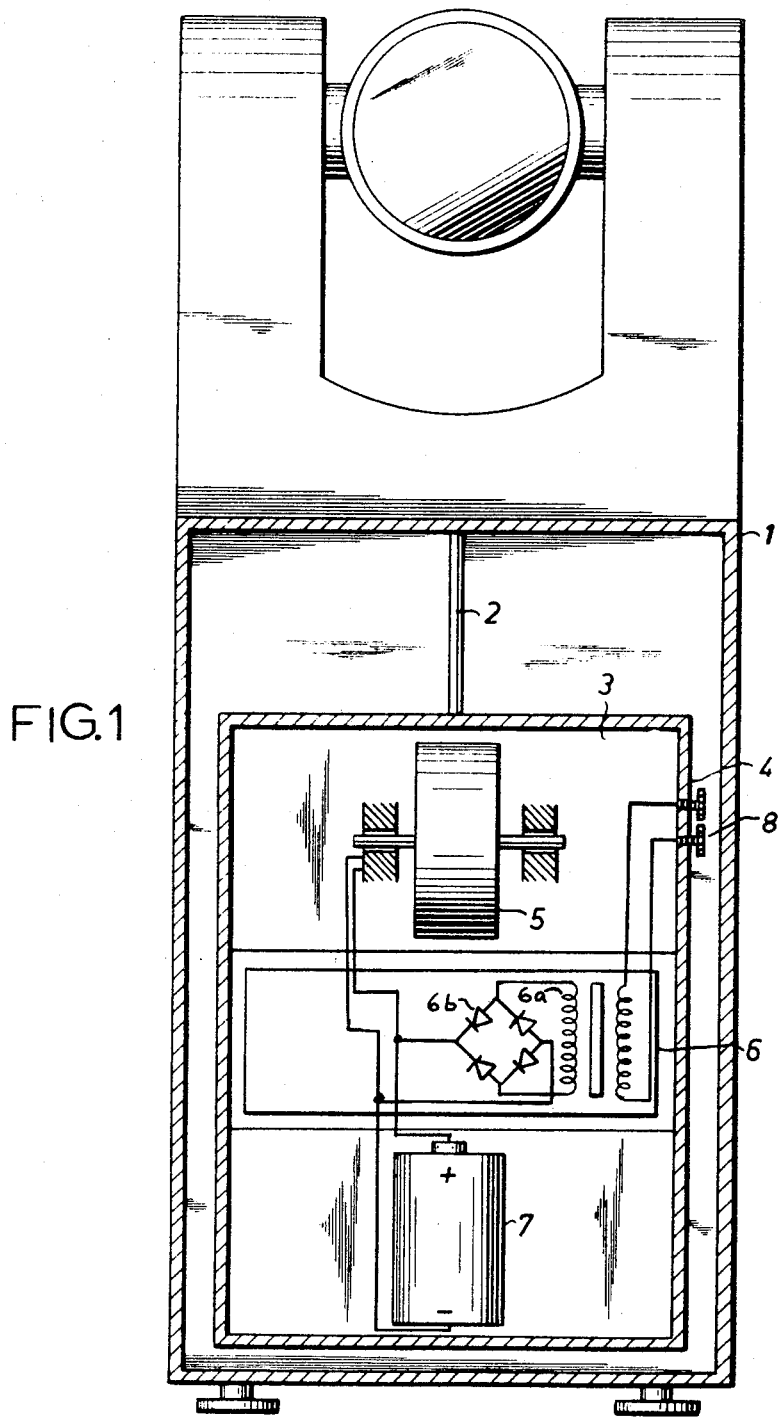
FIG. 1 is a partial sectional view of a gyroscopic theodolite according to the invention.

Referring to FIG. 1, a suspension strip 2 suspends a north-seeking system 3 from a fixed part 1 of a housing. The north-seeking system consists of a housing 4, in which a gyro 5 is mounted. The gyro consists of an electronically controlled brushless d.c. motor with a permanent-magnet rotor adjusted as to its rate of rotation. Such motors are in themselves already known.

Inside the housing there is also located a charging device 6 which, for example, incorporates a low-voltage transformer 6a and a rectifier 6b. By means of connection terminals 8, the north-seeking system can be connected to an a.c. source to provide d.c. power from the rectifier. The charging device is connected in front of a rechargable battery 7. The battery is also installed in the housing 4.

FIG. 2 is a side view of a gyro motor for use with the present invention, showing the outside rotor in cross-section. FIG. 3 is a cross-sectional view of the motor of FIG. 2, taken through the plane shown as line A—A'.

A stator 10 is constructed as a dynamo iron lamination and is pressed onto a bushing 12. Four component windings, shown in connection with FIG. 4, are wound in stator notches 14. The bushing 12 fixes the stator to a base plate 16. A rotor 18 is bell-shaped and is located outside the stator. The rotor is mounted on a shaft 20 which is supported, for example, by two bearings 22 and 24. The shaft 20 also rotates inside the bushing 12.

The rotor includes two permanently magnetized north areas and two south areas indicated as N and S respectively in FIG. 3. Thus, a magnetic path is provided in the rotor and in the stator, with a generally diametrical path across the gap.

Referring to FIG. 4, the circuit for application of current to the motor is illustrated. A battery 30 is illustrated to supply power through a single common 0.5 ohm resistor 32 and through four transistor switches 34, 36, 38 and 40 respectively to the four component stator windings 42, 44, 46 and 48 mentioned above. Two SBV566 Hall generators 50 and 52 are mounted on the stator, separated by 90 mechanical degrees. In this position, the generators are in the permanent magnetic field of the rotor. Each Hall generator has two outputs 180° out of phase with each other. Thus outputs on lines 54 and 56 from Hall generator 50 and outputs on lines 58 and 60 from Hall generator 52 are respectively applied to the bases of transistors 38, 34, 36 and 40 to control the switching times of the four transistors, thereby to excite the stator windings in quadrature.

The supply lines to the Hall generators run directly from the positive terminal of battery 30 and from the negative terminal of battery 30 through a transistor 62 and a 1 Kohm potentiometer 64. The potentiometer 64 is used to make the current supply symmetrical. The resistor 32 serves as a common feedback resistor for temperature stabilization of the emitter circuits of the four winding-control transistors.

The base of transistor 62 can be controlled to control the amount of current supplied to the Hall generators, thereby regulating the torque of the motor. Feedback for this regulation is provided through diodes 68, 70, 72 and 74 to decouple and rectify a voltage proportional to electromotive force (e.m.f.) from each of the four windings and to sum these four voltages at the input to a 2.2 Kohm potentiometer 76. Potentiometer 76 and a 30 microfarad capacitor 78 serve to integrate the summed e.m.f. voltage. The voltage on capacitor 78 is a four-phase half-wave rectified value of the e.m.f. signals, thereby producing a relatively smooth signal useful in terms of control dynamics.

A zener diode 80 produces a voltage which is counterconnected to the capacitor voltage, thereby providing a difference voltage at the base of transistor 62. Potentiometer 76 is used to set the base potential of transistor 62 at a value required to reach a desired speed. If the rotor speed should exceed the desired valve, the voltage on capacitor 78 becomes more negative, causing the difference value on the base of transistor 62 to become more negative. Therefore, the transistor 62 becomes less conductive, causing the current in the Hall generators to decrease. The Hall generators thus cause the transistors 34, 36, 38 and 40 to conduct less, thereby reducing both rotor torque and speed of rotation. On the other hand, if the rotor speed becomes less than the preset desired value, the above process is reversed. A 1.5 Kohm resistor 82 and 10 Kohm resistor 84 provide current to operate zener diode 80.

A transistor 86 used in connection with a 160 ohm collector resistor 88, and a 3.3 Kohm resistor 90 and a 22 Kohm resistor 92 to compensate for any fluctuating voltage from battery 30. If the voltage of battery 30 drops, the base potential of transistor 86 drops, causing transistor 86 to become less conductive. This causes the voltage at the junction of resistors 84 and 82 to rise with respect to the positive terminal battery voltage, causing transistor 62 to become more conductive. This results in greater current to the Hall generators, thereby compensating for lower operating voltages.

The battery 30 is preferably a series connected rechargable battery of seven nickel-cadmium cells with a capacity of 450 mAh and an unloaded voltage of 10.2 volts.

In FIG. 5, diodes 94 and 96 are placed in the charging terminals to prevent discharge through the charging terminals, thereby reducing the chance of accidental discharge to cause fire-damp explosion. In FIG. 5, charging is shown taking place from a removable d.c. source 97. Two switches 98 and 100 are provided between the battery and the electronics and motor section. Switch 98 is a screw controller, equivalent to a contact screw, which is normally closed, but which opens when the system is removed for maintenance. Switch 100 is a key-pin controlled micro-switch for locking and unlocking the system to allow switching over from an outside power source to the battery.

What is claimed is:

1. A measuring system for providing inertial directional reference comprising:
   A. a main housing,
   B. an inner housing suspended from the main housing and adapted to function as a directionally stable subsystem,
   C. a direction measuring gyro mounted on the inner housing for maintaining the inner housing directionally stable, said gyro comprising:
      C1. a stator fixedly mounted on the inner housing,
      C2. a rotor mounted around the stator for rotating as a gyro element, the rotor having regions of permanent magnetism thereon, and
      C3. windings on the stator, adapted, when electrically energized, to cause rotation of the rotor,
   D. a rechargeable battery mounted on the inner housing and electrically connected to the windings for providing electrical power to energize the windings,
   E. electrical isolation means for recharging the battery from outside the inner housing, while preventing electric power from the battery from leaving the inner housing, thereby protecting against the effect of electrical sparks in a possibly unsafe environment,
   F. means for detecting the rotation speed of the rotor, and
   G. feedback means for controlling the flow of current from the battery to said windings for stabilizing the rotation speed.

2. A system according to claim 1 further comprising compensation means responsive to changes in the voltage of the battery for compensating the winding current to reduce the effect of such changes.

* * * * *